United States Patent [19] [11] Patent Number: 6,036,846
Benazzi et al. [45] Date of Patent: Mar. 14, 2000

[54] CATALYST BASED ON MODIFIED NU-87 ZEOLITE AND A PROCESS FOR IMPROVING THE POUR POINT OF FEEDS CONTAINING PARAFFINS

[75] Inventors: Eric Benazzi, Chatou; Nathalie George-Marchal, Paris; Christophe Gueret; Patrick Briot, both of Vienne; Alain Billon, Le Vesinet; Pierre Marion, Paris, all of France

[73] Assignee: Institut Francais du Petrole, France

[21] Appl. No.: 09/103,522

[22] Filed: Jun. 24, 1998

[30] Foreign Application Priority Data

Jun. 25, 1997 [FR] France ................................. 97 07929

[51] Int. Cl.$^7$ .................................................. C10G 47/02
[52] U.S. Cl. ............................ 208/111.3; 502/64; 502/66; 502/74; 502/85; 502/86; 208/27; 208/111.35; 585/752
[58] Field of Search .................................. 502/64, 66, 74, 502/85, 86; 208/111.3, 111.35, 27; 585/752

[56] References Cited

U.S. PATENT DOCUMENTS 5,254,787 10/1993 Dessau ..................................... 585/654
5,756,802 5/1998 Li et al. ................................... 558/319

FOREIGN PATENT DOCUMENTS 377291 7/1990 European Pat. Off. .
378916 7/1990 European Pat. Off. .
0 825 151 2/1998 European Pat. Off. .
2 758 566 7/1998 France .
97/09397 9/1996 WIPO .

*Primary Examiner*—Tom Dunn
*Attorney, Agent, or Firm*—Millen, White, Zelano & Branigan, P.C.

[57] ABSTRACT

The invention concerns a process for improving the pour point of a feed comprising paraffins containing more than 10 carbon atoms, in which process the feed to be treated is brought into contact with a catalyst comprising an NU-87 zeolite comprising silicon and at least one clement T selected from the group formed by Al, Fe, Ga and B, from which at least a portion of clement T has been removed, and having a global Si/T ratio of over 20, the catalyst also containing at least one hydro-dehydrogenating element. The process is carried out at a temperature which is in the range 170° C. to 500° C., a pressure in the range 1 to 250 bar and at an hourly space velocity in the range 0.05 to 100 h$^{-1}$, in the presence of hydrogen in a proportion of 50 to 2000 l/l of feed. The oils obtained have good pour points and high viscosity indices (VI). The process is also applicable to gas oils and other feeds requiring a reduction of pour point. The catalyst is also claimed.

24 Claims, No Drawings

CATALYST BASED ON MODIFIED NU-87 ZEOLITE AND A PROCESS FOR IMPROVING THE POUR POINT OF FEEDS CONTAINING PARAFFINS

BACKGROUND OF THE INVENTION

The present invention concerns a process for improving the pour point of feeds containing linear and/or slightly branched, long (more than 10 carbon atoms) paraffins, in particular to provide good yields on converting feeds with high pour points to at least one cut with a low pour point, and a high viscosity index for oil bases.

The present invention also concerns a modified NU-87 zeolite for use in the process.

High quality lubricants are fundamentally important for the proper operation of modern machines, automobiles and trucks. However, the quantity of paraffins originating directly from untreated crude oil with properties which are suitable for use in good lubricants is very low with respect to the increasing demand in this sector.

Heavy oil fractions containing large amounts of linear or slightly branched paraffins must be treated in order to obtain good quality oil bases in the best possible yields, using an operation which aims to eliminate the linear or slightly branched paraffins from feeds which are then used as base stock, or as kerosene or jet fuel.

High molecular weight paraffins which are linear or very slightly branched which are present in the oils or kerosene or jet fuel result in high pour points and thus in coagulation for low temperature applications. In order to reduce the pour points, such linear paraffins which are not or are only slightly branched must be completely or partially eliminated.

This operation can be carried out by extracting with solvents such as propane or methyl ethyl ketone, termed dewaxing, with propane or methyl ethyl ketone (MEK). However, such techniques are expensive, lengthy and not always easy to carry out.

A further technique is selective cracking of the longest linear paraffin chains to form compounds with a lower molecular weight, part of which can be eliminated by distillation.

Because of their form selectivity, zeolites are among the most widely used catalysts. The idea underlying their use is that zeolite structures exist which have pore openings which allow long linear or very slightly branched paraffins to enter their micropores but which exclude branched paraffins, naphthenes and aromatic compounds. This phenomenon leads to selective cracking of linear or very slightly branched paraffins.

Zeolite based catalysts with intermediate pore sizes such as ZSM-5, ZSM-11, ZSM-12, ZSM-22, ZSM-23, ZSM-35 and ZSM-38 have been described for their use in such processes.

Processes using such zeolites can produce oils by cracking feeds containing less than 50% by weight of linear or linear or very slightly branched paraffins. However, for feeds containing higher quantities of these compounds, it has become apparent that cracking them leads to the formation of large quantities of products with lower molecular weights such as butane, propane, ethane and methane, which considerably reduces the yield of desired products.

In order to overcome these disadvantages, we have concentrated our research on developing catalysts which also encourage isomerisation of such compounds.

United States patent U.S. Pat. No. 5,178,748 describes NU-87 zeolite, its preparation and its use in a dewaxing process. The process is carried out at 27.5 bars, in hydrogen and at 316° C., with a catalyst constituted by a NU-87 zeolite exchanged with nickel (1.45% by weight) then activated and sulphurated. The feed, a heavy gas oil boiling between 119° C. an 458° C., had its pour point reduced by 19.4° C.

In International patent application WO-97/09 397, the applicant proposed a hydroisomerization treatment process using a catalyst based on NU-87 zeolite, the process being carried out in particular on heavy feeds in order to produce oils.

We have also sought to improve the process. We have discovered that a catalyst based on dealuminated NU-87 improves not only the pour point of the feed but also the viscosity index of base stock, and when lighter feeds such as gas oils are treated, the dewaxing yield is improved. Further, the increased stability of the catalyst results in a less expensive process.

SUMMARY OF THE INVENTION

The invention provides a process for improving the pour point of a feed comprising paraffins containing more than 10 carbon atoms, carried out at a temperature which is in the range 170° C. to 500° C., a pressure in the range 1 to 250 bar, an hourly space velocity in the range 0.05 to 100 $h^{-1}$, and in the presence of hydrogen in a proportion of 50 to 2000 l/l of feed, the feed being brought into contact with a catalyst based on NU-87 zeolite comprising silica and at least one element T selected from the group formed by aluminium, iron, gallium and boron, from which at least a portion of element T has been removed, and having a global Si/T atomic ratio of over 20, the catalyst also comprising at least one hydro-dehydrogenating element.

The invention also provides a preferred catalyst for use in the process, the catalyst being based on NU-87 zeolite, comprising silica and at least one element T selected from the group formed by aluminium, iron, gallium and boron, from which at least a portion of element T has been removed, and with a global Si/T atomic ratio of over 20, the catalyst also comprising at least one hydro-dehydrogenating element selected from the group formed by rhenium, niobium, combinations of at least one group VIII metal and at least one group VI metal.

NU-87 zeolite in its hydrogen form, termed H-NU-87, obtained by calcining and/or ion exchanging as synthesised NU-87, used in the process of the invention, and its synthesis a described in European patent EP-A1 0 377 291.

NU-87 zeolite in its hydrogen form, as used in the present invention, has a two-dimensional micropore network with a pore diameter of 4.7×6.0 Å ("The Atlas of Zeolite Structure Types", by W. M. Meier and D. H. Olson, $3^{rd}$ edition, 1992). The X ray diffraction diagrams of the zeolite are given in European patents EP-B 1 -0 378 916 and in EP-B 1-0 377 291. With those pore diameters, NU-87 zeolite is in the category of medium pore zeolites.

The NU-87 zeolite used comprises silicon and at least one element T selected from the group formed by aluminium, iron, gallium and boron, preferably aluminium; it has been dealuminated or, more generally, at least a portion of element T has been removed, and it thus has a global Si/T atomic ratio of over about 20. Element T is preferably extracted from the zeolitic framework (network) by at least one heat treatment, optionally carried out in the presence of steam, followed by at least one acid attack or by direct acid attack using at least one solution of a mineral or organic acid.

The global Si/T atomic ratio of the zeolite is preferably over about 20 and advantageously about 22, preferably over about 25 or 30 and more preferably, Si/T is less than about 350 or still more preferably, less than 100.

The NU-87 zeolite (and advantageously that in which the ratio Si/T is over 20) is at least partially, preferably almost completely, in its acid form, i.e., in its hydrogen form ($H^+$). The Na/T atomic ratio is generally less than 10%, preferably less than 5% and more preferably less than 1%.

The process can advantageously convert a feed with a high pour point to a mixture (for example oil) with a lower pour point and, in the case of oil, a high viscosity index. It can also be applied to reducing the pour point of gas oils, for example.

Among others, the feed is composed of linear and/or slightly branched paraffins containing at least 10 carbon atoms, preferably 15 to 50 carbon atoms, and advantageously 15 to 40 carbon atoms. Heavy feeds comprise paraffins essentially containing more than 30 carbon atoms and produce base stock; gas oils are lighter and contain paraffins containing 10–30 carbon atoms.

The catalyst comprising the NU-87 molecular sieve (with at least partial extraction of T) results in hydroisomerisation of the feed accompanied by limited cracking reactions which do not lead to too great a production of light products.

The isomerized products may contain about 65% to 80% of single-branched products and about 20% to 35% of multi-branched products. The term "single-branched products" means linear paraffins comprising a single methyl group, and the term "two-branched products" means linear paraffins containing 2 methyl groups which are not carried by the same carbon atom. Thus "multi-branched" paraffins can be defined by extension.

Further, the catalyst comprises at least one hydro-dehydrogenating function, for example a group VIII metal (noble or non-noble) or a combination of at least one group VIII (non noble) metal or compound and at least one group VI metal or compound, and the reaction is carried out under conditions which will be described below.

Using the NU-87 zeolite of the invention under the conditions described above can produce products with a low pour point and oils with a high viscosity index, in good yields.

The global Si/T ratio of the zeolite and the chemical composition of the samples are determined by X ray fluorescence and atomic absorption.

The NU-87 can also be more precisely characterized from X ray diffraction diagrams by measuring, for each sample, the total surface area of the signal over an angular range (2) of 6° to 40°, then in the same zone, the surface area of peaks as the number of impulses for a stepwise recording of 3 seconds in 0.02° intervals (2). The ratio of these two values, peak surface area/total surface area, is characteristic of the quantity of crystalline material in the sample. For each sample treated, this ratio or "peak factor" is compared with the peak factor for a reference sample arbitrarily considered as totally crystallized (100%). The degree of crystallinity is then expressed as a percentage with respect to a reference which it is very important to select properly, as the relative intensity of the peaks varies as a function of the nature, proportion and position of the different atoms in the unit cell, in particular the cations and the structuring agent. For measurements carried out on the examples in the present description, the selected reference was NU-87 zeolite in its calcined form in dry air and exchanged three times in succession with an ammonium nitrate solution.

A finer characterization of the zeolite of the invention can be made, as will be shown below and in the examples. Since NU-87 zeolites crystallize in the monoclinic system, four parameters have to be measured to characterize the geometry of the unit cell (typical values are substantially as follows, given that a skilled person will know that slight variations are possible depending on the form taken by the zeolite: a=14.3 Å; b=22.4 Å; c=25.1 Å, and b=151.5°). Further, this cell is large and of poor symmetry, and thus diffractograms for type NU-87 zeolites contain many peaks which interfere to a large extent. The structure of these solids has been resolved and the atomic positions of the framework are known (M. D. Shannon, J. L. Casci, P. A. Cox and S. J. Andrews, Structure of the two-dimensional medium-pore high-silica NU-87 zeolite, Letters to Nature, vol. 353, 1991). The complete refinement of the diagram using the Rietveld method was used to obtain a reliable measurement of the cell parameters. GSAS (General Structure Analysis System) software was then used; in addition to the monoclinic crystalline system and the starting parameters a, b, c and b, the data input included: the space group $P2_1/c$, atomic positions, degree of site occupation and temperature factors of the asymmetrical unit (M. D. Shannon, J. L. Casci, P. A. Cox and S. J. Andrews, Structure of the two-dimensional medium-pore high-silica NU-87 zeolite, Letters to Nature, vol. 353, 1991) and the instrumental parameters which determine the peak profiles. The refining parameters are thus a, b, c, β and the volume of the unit cell.

It is also possible to estimate the micropore volume from the quantity of nitrogen adsorbed at 77 K for a partial pressure $P/P_0$ of 0.19, as an indication.

In order to prepare the dealuminated NU-87 zeolite of the invention, in the preferred case where T is Al, two dealumination methods can be used starting from an as synthesised NU-87 zeolite comprising an organic structuring agent. They are described below. However, any other method which is known to the skilled person can also be used in the invention.

These methods described for Al can also be suitable for other elements T.

The first (preferred) method, direct acid attack, comprises a first calcining step carried out in dry air, at a temperature which is generally in the range 450° C. to 550° C., which eliminates the organic structuring agent present in the micropores of the zeolite, followed by a step in which the zeolite is treated with an aqueous solution of a mineral acid such as $HNO_3$ or HCl or an organic acid such as $CH_3CO_2H$. This latter step can be repeated as many times as is necessary to obtain the desired degree of dealumination. Between these two steps, one or more ion exchange steps can be carried out using at least one NH4NO3 solution, to at least partially and preferably almost completely eliminate the alkaline cation, in particular sodium. Similarly, at the end of the direct acid attack dealumination step, one or more ion exchange steps may be carried out using at least one $H_4NO_3$ solution to eliminate residual alkaline cations, in particular sodium.

In order to obtain the desired Si/Al ratio, the operating conditions must be correctly selected; the most critical parameter in this respect are the temperature of the treatment with the aqueous acid solution, the concentration of the latter, its nature, the ratio between the quantity of acid solution and the mass of the treated zeolite, the treatment period and the number of treatments carried out.

Dealumination can also be achieved using chemical dealuminating agents such as (by way of non exhausting examples) silicon tetrachloride ($SiCl_4$), ammonium hexafluorosilicate [$(NH_4)_2SiF_6$], and ethylenediaminetetra-acetic acid EDTA), including its mono and disodium forms. These reactants can be used in solution or in the gaseous phase, for example in the case of $SiCl_4$.

The second method, heat treatment (in particular using steam, by steaming) + acid attack, comprises firstly calcining in dry air at a temperature which is generally in the range 450° C. to 550° C., to eliminate the organic structuring agent occluded in the micropores of the zeolite. The solid obtained then undergoes one or more ion exchanges using at least one $NH_4NO_3$ solution, to eliminate at least a portion, preferably practically all, of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 500° C. to 900° C., and followed by at least one acid attack using an aqueous solution of a mineral or organic acid as defined above. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the Saint reason, the number of heat treatment - acid attack cycles can be varied.

In a variation of this second method, the acid attack step, i.e., treatment using a solution of an acid, can be replaced by treatment with a solution of a chemical dealuminating compound such as those cited above, for example, namely silicon tetrachloride ($SiC_4$), ammonium hexafluorosilicate [$(NH_4)_2SiF_6$], ethylenediaminetetra-acetic acid (EDTA), including its mono and disodium forms.

In the preferred case when T is Al, the framework dealumination cycle, comprising at least one beat treatment step, optionally and preferably carried out in the presence of steam, and at least one attack step carried out on the NU-87 zeolite in an acid medium, can be repeated as often as is necessary to obtain the dealuminated NU-87 zeolite having the desired characteristics. Similarly, following the heat treatment, optionally and preferably carried out in the presence of steam, a number of successive acid attacks can be carried out using different acid concentrations.

In a variation of this second calcining method, heat treatment of the NU-87 zeolite containing the organic structuring agent can be carried out at a temperature which is generally in the range 500° C. to 850° C., optionally and preferably in the presence of steam. In this case, the steps of calcining the organic structuring agent and dealuminating the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally undergo at least one ion exchange step using at lest one $NH_4NO_3$ solution, to eliminate practically all of the alkaline cations, in particular sodium, present in the cationic position in the zeolite.

Using these methods, at least a portion of elements T are removed from the zeolite framework and are advantageously extracted from the sample.

In this advantageous case, the global Si/T atomic ratio of the zeolite is higher than that of the starting zeolite, the difference in general being at least 10% of the Si/T ratio of the starting zeolite.

The surface Si/T ratio (obtained by XPS) does not reduce, and advantageously it increases.

The catalyst contains at least one hydro-dehydrogenating element, for example at least one group VIII metal. It may be a noble metal, advantageously selected from the group formed by Pt or Pd, which is introduced into the molecular sieve by dry impregnation or ion exchange, for example, or by any other method which is known to the skilled person, or it is introduced into the matrix.

The amount of metal thus introduced, expressed as the weight % with respect to the mass of molecular sieve engaged, is generally less than 5%, preferably less than 3%, and the amount of noble metal in the catalyst is generally less than 2% by weight.

The hydro-dehydrogenating element can also be a combination of at least one group VI metal or compound (for example molybdenum or tungsten) and at least one non noble group VIII metal or compound (for example nickel or cobalt). The total concentration of group VI and group VIII metals, expressed as the metal oxides with respect to the support, is generally in the range 5% to 40% by weight, preferably in the range 7% to 30% by weight. The weight ratio (expressed as the metallic oxides) of group VIII metals to group VI metals is preferably in the range 0.05 to 0.8: more preferably in the range 0.13 to 0.5.

The element can also be rhenium and/or niobium, used alone or in combination with the group VIII and/or VI elements.

This type of catalyst can advantageously contain phosphorous, the content of which is generally less than 15% by weight, preferably less than 10% by weight, expressed as phosphorous oxide $P_2O_5$ with respect to the support.

When treating a real feed, the molecular sieve of the invention is first formed. In a first variation, the molecular sieve can have at least one hydro-dehydrogenating element deposited on it, and it can be formed by any technique which is known to the skilled person. In particular, it can be mixed with a matrix, which is generally amorphous, for example a moist alumina gel powder. The mixture is then formed, for example by extrusion through a die. The amount of molecular sieve in the mixture obtained is generally in the range 0.5% to 99.9%, advantageously in the range 5% to 90% by weight, with respect to the mixture (molecular sieve + matrix) and preferably in the range 10% to 90%, more preferably in the range 20% to 70%.

In the remaining text, the term "support" is used to describe the molecular sieve + matrix mixture.

Forming can be carried out with matrices other than alumina, such as magnesia, amorphous silica-aluminas, natural clays (kaolin, bentonite, sepiolite, attapulgite), silica, titanium oxide, boron oxide, zirconia, aluminium phosphates, titanium phosphates, zirconium phosphates, coal, and mixtures thereof. Techniques other than extrusion can be used, such as pelletization or bowl granulation.

The group VIII hydrogenating metal, preferably Pt and/or Pd, can also very advantageously be deposited on the support using any process which is known to the skilled person which can deposit metal on the molecular sieve. Competitive cation exchange can be used, with ammonium nitrate as the preferred competing agent, the competition ratio being at least about 20 and advantageously about 30 to 200. When platinum or palladium is used, a platinum tetramine complex or a palladium tetramine complex is normally used: these latter are almost completely deposited on the molecular sieve. This cation exchange technique can also be used to deposit the metal directly on powdered molecular sieve before mixing it with any matrix.

Deposition of the group VIII metal(s) is generally followed by calcining in air or oxygen, usually between 300° C. and 600° C. for 0.5 to 10 hours, preferably between 350° C. and 550° C. for 1 to 4 hour. Reduction in hydrogen can then follow, generally at a temperature which is in the range 300° C. to 600°C. for 1 to 10 hours, preferably in the range 350° C. to 550° C. for 2 to 5 hours.

The platinum and/or palladium can also be deposited not directly on the molecular sieve, but on the matrix (alumina binder) before or after forming, by anion exchange with hexachloroplatinic acid, hexahloropalladic acid and/or palladium chloride in the presence of a competing agent, for example hydrochloric acid. As before, after depositing the platinum and/or palladium, the catalyst is generally calcined then reduced in hydrogen as indicated above.

The non noble group VIII metals or an association of oxides of non noble group VI and VIII metals, comprising the hydrogenating function, can be introduced into the catalyst at various stages of the preparation and in various fashions.

It can be introduced only in part (for associations of group VI and VIII metal oxides) or completely on mixing the molecular sieve of the invention with the gel of the oxide selected as the matrix. It can be introduced using one or more ion exchange operations on the calcined support constituted by the molecular sieve of the invention dispersed in the selected matrix, using solutions containing precursor salts of the selected metals when these belong to group VIII. They may be introduced by one or more impregnation operations carried out on the formed and calcined support, using a solution of precursors of oxides of metals from group VIII (in particular cobalt or nickel) when the precursors of oxides of metals from group VI (in particular molybdenum or tungsten) have been introduced first on mixing the support. Finally, it can be introduced by one or more impregnation operations carried out on the calcined support constituted by a molecular sieve of the invention and the matrix, using solutions containing the precursors of the oxides of metals from groups VI and/or VIII, the precursors of oxides from group VIII metals preferably being introduced after those of group VI or at the same time as the latter.

When the metal oxides are introduced in a plurality of impregnation steps using the corresponding precursor salts, an intermediate calcining step must be carried out at a temperature in the range 250° C. to 600° C.

Molybdenum impregnation can be facilitated by adding phosphoric acid to the ammonium paramolybdate solutions.

The mixture is then formed, for example by extrusion through a die. The amount of molecular sieve in the mixture obtained is generally in the range 0.5% to 99.9%, advantageously in the range 10% to 90% by weight with respect to the mixture (molecular sieve + matrix), preferably in the range 20% to 70%.

Deposit of the final metal is generally followed by calcining in air or in oxygen, usually between 300° C. and 600° C. for 0.5 to 10 hours, preferably between 350° C. and 550° C. for 1 to 4 hours.

It is then generally followed by sulphuration of the catalyst before bringing it into contact with the feed, using any method known to the skilled person. Thus in this case the catalyst advantageously contains sulphur.

Feeds which can be treated using the process of the invention are advantageously fractions with relatively high pour points the values of which are to be reduced.

The process of the invention can be used to treat a variety of feeds, from relatively light fractions such as kerosenes and jet fuels to feeds with higher boiling points such as middle distillates, vacuum residues, gas oils, middle distillates from FCC (LCO and HCO) and hydrocracking residues.

The feed to be treated is, for the most part, a $C_{10}^+$ cut with an initial boiling point of more than about 175° C., preferably a heavy cut with a boiling point of at least 280° C., advantageously a boiling point of at least 380° C. The process of the invention is particularly suitable for treating paraffinic distillates such as middle distillates which encompass gas oils, kerosenes, jet fuels, vacuum distillate, and all other fractions with a pour point and viscosity which must be adapted to satisfy specifications.

Feeds which can be treated using the process of the invention can contain paraffins, olefins, naphthenes, aromatics and heterocycles and have a high proportion of high molecular weight n-paraffins and very slightly branched paraffins, also of high molecular weight.

The reaction is carried out so that the cracking reactions remain sufficiently low to render the process economically viable. The amount of cracking reactions is generally below 40% by weight, preferably below 30%, and advantageously below 20%.

Typical feeds which can advantageously be treated by the process of the invention generally have a pour point of more than 0° C. The products resulting from treatment in accordance with the process have pour points of below 0° C., preferably below about −10° C.

These feeds contain amounts of n-paraffins and very slightly branched paraffins containing more than 10 carbon atoms, also with high molecular weight, of over 30% and up to about 90%, and in some cases more than 90% by weight. The process is of particular interest when this proportion is at least 60% by weight.

Non limiting examples of other feeds which can be treated in accordance with the invention are bases for lubricating oils, synthesized paraffins from the Fischer-Tropsch process, high pour point polyalphaolefins, synthesized oils, etc. . . The process can also be applied to other compounds containing an n-alkane chain such as those defined above, for example n-alkylcycloalkanes, or containing at least one aromatic group.

The process is carried out under the following operating conditions:
  the reaction temperature is in the range 170° C. to 500° C., preferably in the range 180° C. to 470° C., advantageously 190° C. to 450° C.;
  the pressure is in the range 1 to 250 bar, preferably in the range 10 to 200 bar;
  the hourly space velocity (HSV expressed as the volume of feed injected per unit volume of catalyst per hour) is in the range about 0.05 to about 100, preferably about 0.1 to about 30 $h^{-1}$.

The feed and the catalyst are brought into contact in the presence of hydrogen. The amount of hydrogen used, expressed in litres of hydrogen per liter of feed, is in the range 50 to about 2000 liters of hydrogen per liter of feed, preferably in the range 100 to 1500 liters of hydrogen per liter of feed.

The quantity of nitrogen compounds in the feed to be treated is preferably less than about 200 ppm by weight, more preferably less than 100 ppm by weight. The sulphur content is below 1000 ppm by weight, preferably less than 500 ppm, more preferably less than 200 ppm by weight. The quantity of metals in the feed, such as Ni or V, is extremely low, i.e., less than 50 ppm by weight, preferably less than 10 ppm by weight and more preferably less than 2 ppm by weight.

The compounds obtained using the process of the invention may be single-branched, two-branched and multi-branched compounds, advantageously with methyl groups.

The following examples illustrate the invention without limiting its scope.

EXAMPLES

Example 1

The starting material was an NU-87 with a global Si/Al atomic ratio of 17.5, and a sodium weight content corresponding to a Na/Al atomic ratio of 0.144. This NU-87 zeolite was synthesized as described in EP-B1-0 377 29 1.

This NU-87 zeolite first underwent dry calcining at 550° C. in a stream of dry air for 6 hours. The solid obtained underwent four ion exchange steps in a solution of 10 N $NH_4NO_3$ at about 100° C. for 4 hours for each exchange step. The solid obtained was designated as $NH_4$-NU-87 and had an Si/Al ratio of 17.4 and an Na/Al ratio of 0.002. The remaining physico-chemical characteristics are shown in Table 1.

TABLE 1

| Sample | X ray diffraction Parameters | | | | | | Adsorption | |
|---|---|---|---|---|---|---|---|---|
| | a (Å) | b (Å) | c (Å) | β (°) | V (Å$^3$) | Crystallinity (%) | $S_{BET}$ (m$^2$/g) | V(P/P$_0$ = 0.19) ml liquid N$_2$/g |
| NH4-NU-87 | 14.35 | 22.34 | 25.14 | 151.53 | 3840 | 100 | 466 | 0.19 |

The NU-87 zeolite then underwent treatment with a 7 N nitric acid solution at about 100° C. for 5 hours. The volume V of the nitric acid solution used (in ml) was 10 times the weight W of the dry NU-87 zeolite (V/W=10). This treatment with 7 N nitric acid was carried out a second time under the same operating conditions.

After these treatments, the zeolite obtained, designated H-NU-87/1, was in its H form and had a global Si/Al atomic ratio or 34.6 and a Na/Al ratio of less than 0.002. These crystallographic and adsorption characteristics are shown in Table 2 below.

TABLE 2

| Sample | X ray diffraction Parameters | | | | | | Adsorption | |
|---|---|---|---|---|---|---|---|---|
| | a (Å) | b (Å) | c (Å) | β (°) | V (Å$^3$) | Crystallinity (%) | $S_{BET}$ (m$^2$/g) | V(P/P$_0$ = 0.19) ml liquid N$_2$/g |
| H-NU-87/1 | 14.33 | 22.35 | 25.09 | 151.5 | 3835 | 97 | 496 | 0.21 |

The NU-87 crystallites were in the form of crystals 0.4 μm to 2 μm in size.

The zeolite war mixed with SB3 type alumina from Condéa. The mixed paste was extruded through a 1.2 mm die. The extrudates were then calcined at 500° C. for 2 hours in air then dry impregnated with a solution of platinum tetramine chloride [Pt(NH$_3$)$_4$]Cl$_2$, and finally calcined in air at 550° C. The platinum content in the final catalyst Cl was 0.7% by weight and the zeolite content, expressed with respect to the ensemble of the catalyst mass, was 30% by weight.

Example 2

The starting material was the same NU-87 as that used in Example 1. This NU-87 zeolite first underwent dry calcining at 550° C. in a stream of dry air for 6 hours. The solid obtained underwent ion exchange in a solution of 10 N $NH_4NO_3$ at about 100° C. for 4 hours. The NU-87 zeolite then underwent treatment with a 68% by weight nitric acid solution at about 100° C. for 6 hours. The volume V of the nitric acid solution used (in ml) was 10 times the weight W of the dry NU-87 zeolite (V/W=10).

After these treatments, the zeolite obtained, designated H-NU-87/2, was in its H form and had a global Si/Al atomic ratio of 57 and a Na/Al ratio of less than 0.002. These crystallographic and adsorption characteristics are shown in Table 3 below.

TABLE 3

| Sample | X ray diffraction Parameters | | | | | | Adsorption | |
|---|---|---|---|---|---|---|---|---|
| | a (Å) | b (Å) | c (Å) | β (°) | V (Å$^3$) | Crystallinity (%) | S$_{BET}$ (m$^2$/g) | V(P/P$_0$ = 0.19) ml liquid N$_2$/g |
| H-NU-87/2 | 14.32 | 22.33 | 25.08 | 151.5 | 3832 | 96 | 475 | 0.19 |

The zeolite was mixed with SB3 type alumina from Condéa. The mixed paste was extruded through a 1.2 mm die. The extrudates were then calcined at 500° C. for 2 hours in air then dry impregnated with a solution of platinum tetramine chloride [Pt(NH$_3$)$_4$]$Cl_2$, and finally calcined in air at 550° C. The platinum content in the final catalyst C2 was 0.7% by weight and the zeolite content, expressed with respect to the ensemble of the catalyst mass, was 30% by weight.

Example 3: Evaluation of catalysts on a hydrocracking residue

The catalyst was evaluated by treating a hydrocracking residue from a vacuum distillate.

The feed had the following characteristics:

| | |
|---|---|
| Sulphur content (ppm by weight) | 21 |
| Nitrogen content (ppm by weight) | 3 |
| Pour point (° C.) | +38 |
| Initial boiling point | 321 |
| 10% | 385 |
| 50% | 449 |
| 90% | 531 |
| End point | 556 |

The catalyst had been reduced in hydrogen at 450° C. before the catalytic test, in situ in the reactor. This reduction was can out in stages. It consisted of a stage at 150° C. for 2 hours, then an increase of the temperature to 450° C. at a rate of 1°C./min, then a stage of 2 hours at 450° C. During this reduction procedure, the hydrogen flow rate was 1000 litres of H$_2$ per litre of catalyst.

For catalyst Cl, the reaction took place at 325° C. at a total pressure of 12 MPa, an hourly space velocity of 1.7 h$^{-1}$ and at a hydrogen flow rate of 1000 litres of H$_2$ per litre of feed. For catalyst C2, the reaction took place at 355° C. at a total pressure of 12 MPa, an hourly space velocity of 1.5 h$^{-1}$ and at a hydrogen flow rate of 1000 litres of H$_2$ per litre of feed. Under these operating conditions, the net conversion of 400 compounds, the base stock yields and the characteristics of the oils obtained are shown in the following table.

| | C1, of the invention | C2, of the invention |
|---|---|---|
| Viscosity index VI | 133 | 129 |
| Pour point (° C.) | −19 | −21 |
| Net conversion of 400$^−$ compounds (weight %) | 22 | 24 |
| Oil yield (weight %) | 79 | 78 |

These examples show the importance of the process of the invention which can reduce the pour point of the initial feed, in the case of a hydrocracking residue, while retaining a high viscosity index (VI).

We claim:

1. A process for improving the pour point of a feed comprising paraffins containing more than 10 carbon atoms, comprising contacting the feed with a catalyst comprising an NU-87 zeolite containing silicon and at least one element T which is aluminium, iron, gallium or boron, from which at least a portion of element T has been removed, and having a global Si/T ratio of over 20, the catalyst also containing at least one hydro-dehydrogenating element and phosphorous.

2. A process according to claim 1, in which the hydro-dehydrogenating element is a noble group VIII element.

3. A process according to claim 1, in which the hydro-dehydrogenating element is a combination of at least one group VI metal or compound and at least one non noble group VIII metal or compound.

4. A process according to claim 3, in which the catalyst comprises a support and less than 15% by weight phosphorous expressed as P$_2$O$_5$, with respect to the support.

5. A process according to claim 1, in which the element T is aluminium.

6. A process according to claim 1, in which the Si/T molar ratio is over 22.

7. A process according to claim 1, in which the Si/T molar ratio is less than 350.

8. A process according to claim 1, in which the zeolite is at least partially in its acid form.

9. A process according to claim 1, in which the catalyst contains at least one matrix selected from the group formed by clays, magnesia, alumina, silica titanium oxide, boron oxide, zirconia, aluminium phosphates, titanium phosphates, zirconium phosphates, silica-aluminas and coal.

10. A process according to claim 1, in which the compound to be treated is present in a hydrocarbon feed selected from the group formed by middle distillates, gas oils, vacuum residues, hydrocarbon residues, paraffins from the Fischer-Tropsch process, synthesis oils, gas oil cuts and middle distillate from FCC, oils, and polyalphaolefins.

11. A process according to claim 1, in which the amount of zeolite in the catalyst is in the range 0.5% to 99.9% by weight.

12. A process according to claim 1, in which the zeolite is dealuminated by at least one treatment with an acid solution.

13. A process according to claim 1, in which the zeolite is dealuminated by at least one heat treatment followed by at least one treatment with an acid solution.

14. A process according to claim 1, in which the zeolite is dealuminated by at least one heat treatment followed by at least one treatment with a chemical dealuminating agent.

15. A process according to claim 1, in which the zeolite is dealuminated by at least one treatment with ammonium hexafluorosilicate, silicon tetrachloride, ethylenediaminetetra-acetic acid, or a sodium or disodium form thereof.

16. A process according to claim 1, carried out at a temperature of 170° C. to 500° C., a pressure of 1 to 250 bar, at an hourly space velocity of 0.05 to 100 h$^{-1}$ and in the presence of hydrogen in a proportion of 50 to 1000 l/l of feed.

17. A catalyst based on NU-87 zeolite, comprising silicon and at least one element T which is aluminium, iron, gallium or boron, from which at least a portion of element T has been removed, and having a global Si/T atomic ratio of over 20, the catalyst also comprising at least one hydro-dehydrogenating element and phosphorous.

18. A catalyst according to claim 17, comprising a support, wherein phosphorous is contained in an amount of less than 15% by weight, expressed as $P_2O_5$, with respect to the support.

19. A catalyst according to claim 17, containing 0.5% to 99.9% by weight of zeolite.

20. A catalyst according to claim 17, in which the zeolite is dealuminated by: treatment with an acidic solution; at least one heat treatment followed by treatment with an acidic solution; or at least one heat treatment followed by at least one treatment with a chemical dealuminating compound.

21. A catalyst according to claim 20, in which the zeolite is dealuminated by at least one treatment with a chemical dealuminating compound.

22. A catalyst according to claim 21, wherein the dealuminating compound is ammonium hexafluorosilicate, silicon tetrachloride, ethylenediaminetetra-acetic acid, or a sodium or disodium form thereof.

23. A catalyst according to claim 20, wherein the dealuminating compound is ammonium hexafluorosilicate, silicon tetrachloride, ethylenediaminetetra-acetic acid, or a sodium or disodium form thereof.

24. A catalyst according to claim 17, wherein the hydro-dehydrogenating element is rhenium, niobium or a combination of at least one group VIII metal and at least one group VI metal.

* * * * *